United States Patent [19]

Pastor et al.

[11] 3,969,491

[45] July 13, 1976

[54] PURIFICATION OF ALKALI METAL CHLORIDES AND BROMIDES

[75] Inventors: Ricardo C. Pastor, Manhattan Beach; Arthur J. Timper, Torrance, both of Calif.

[73] Assignee: Hughes Aircraft Company, Culver City, Calif.

[22] Filed: Aug. 18, 1975

[21] Appl. No.: 605,697

Related U.S. Application Data

[63] Continuation-in-part of Ser. No. 351,214, April 16, 1973.

[52] U.S. Cl. .............................................. 423/499
[51] Int. Cl.$^2$...................... C01D 3/14; C01D 3/20; C01D 3/04; C01D 3/10
[58] Field of Search ..................................... 423/499

[56] References Cited
UNITED STATES PATENTS
3,826,817   7/1974   Pastor et al........................ 423/499

FOREIGN PATENTS OR APPLICATIONS
1,137,582   12/1968   United Kingdom................. 423/499

OTHER PUBLICATIONS

McPherson and Henderson Book "A Course in General Chem.," 3rd Ed., 1927, pp. 229, 230, Ginn & Co., N.Y.

Lawson & Nielsen Book "Preparation of Single Crystals," 1958, pp. 57, 58, Butterworths Scient. Pub., London.

*Primary Examiner*—Edward Stern
*Attorney, Agent, or Firm*—Booker T. Hogan, Jr.; W. H. MacAllister

[57] ABSTRACT

We have discovered that alkali halides may be purified, particularly of trace anionic and cationic impurities, by scrubbing a melt of the alkali halide with gaseous nascent halogen. The halide radical of the gaseous nascent halogen preferably corresponds to the halide radical of the alkali halide. The purified material may then be used to form single crystals from which laser windows may be produced.

5 Claims, No Drawings

PURIFICATION OF ALKALI METAL CHLORIDES AND BROMIDES

This invention was made under a contract with the Department of Defense.

This application is a Continuaton-in-Part of prior application Ser. No. 351,214, filed Apr. 16, 1973, which was co-pending with this application on its filing date and which is assigned to the same assignee as is this application.

RELATED DISCLOSURES

In U.S. application Ser. No. 275,130, filed July 26, 1972, by A. C. Pastor and R. C. Pastor, and issued as U.S. Pat. No. 3,826,817, the use of dissociated carbon halide gas to convert a metal salt to the corresponding metal halide is disclosed. The metal salt in finely divided form is contacted in the solid form with the dissociated carbon halide.

In U.S. application Ser. No. 334,179, filed Feb. 20, 1973, by R. C. Pastor, molten metal halides are passed through a bed of carbon particles to remove oxide and hydroxide impurities. This application was abandoned upon the filing of Continuation Application Ser. No. 604,588 and Divisional Application Ser. No. 604,589 on Aug. 14, 1975.

In U.S. application Ser. No. 349,516, filed Apr. 9, 1973, by R. C. Pastor, laser windows are exposed to an atmosphere of gaseous nascent halogen to remove hydroxyl impurities in the surfaces of said laser windows.

The three preceding applications and this application have a common assignee.

BACKGROUND OF THE INVENTION

The use of alkali metal halides in sigle crystal form for the manufacture of laser windows is known. In addition, it has been established that for maximum efficiency the alkali metal halide should be as pure as possible. Even materials having purities of 99.999% form windows which have an undesirable tendency to absorb energy from the laser beam. This causes the window to overheat which in turn will cause it to fracture and become comparatively opaque.

Alkali metal halides have been purified by numerous prior art methods. Most of these methods involve processes incapable of producing material of the purity required for use in the laser technology. For example, French patent 1,326,657, dated Apr. 1, 1963, was directed to a process for rectification of fused salt baths used in a steel treatment process. An inert carrier is used as a vehicle for the reactive agents, $SiCl_4$ or $TiCl_4$, which getters the oxide impurity, causing a decarbonization of the steel being processed. The resultant metal oxide, $SiO_2$ or $TiO_2$ precipitates out and settles as mud at the bottom. No extension of this process could lead to ultra pure metal halide materials. The melt is saturated with oxide with respect to the metal oxide ingredients of the mud and there is no significant liberation of free halogens which act as purifying agents.

U.S. Pat. No. 2,770,526, by Lander, teaches a Method for Purifying Metal Halides for use in the production of a ductile titanium metal. Lander causes molecular chlorine to react with metal ion impurities in $CaCl_2$ via the dissociation reaction of $CCl_4$ shown below.

$$CCl_4 \rightleftarrows C + 2Cl_2 \qquad (1)$$

This process is inapplicable in the removal of cation and anion impurities from alkali metal halides. Molecular chlorine is not very effective for removing anion impurities such as hydroxides and oxides and the process does not favor production of nascent chlorine. In addition, carbon, a product of the reaction taught by Lander, is an undesirable complication in crystal growth.

U.S. Pat. No. 3,565,700, by C. B. Root, dated Feb. 23, 1971, discloses a method for preparing and purifying pure dry fluoride materials. Fluorine gas is passed through the fluoride materials in a refractory oxide material rotating chamber. Root does not achieve the degree of dryness required to remove $OH^-$ from a metal halide. Column 1, lines 53–56, show that Root is not concerned with sources of $H_2O$ in the system. further, Root replaces the flow of the reactive atmosphere in his chamber with an inert gas to allow the materials to cool. This process coupled with the apparatus seal off step (Column 4, lines 2–3), results in a rehydrolysis of the purified materials. Rehydrolysis during the purification process precludes one from obtaining materials free of $OH^-$ impurities as needed in laser applications.

British patent 1,123,991, dated Aug. 1968, discloses a method of preparation of pure alkali metal halides for the production of single crystals. The process is a conversion process which generally proceeds according to the following reaction.

$$Na_2SO_4 + C + Cl_2 \rightarrow 2NaCl + CO_2 + SO_2 \qquad (2)$$

Carbon is used solely as a reactant to oxyanions functioning as a reductant. In our application, where purification of, and not conversion to the halide is achieved, fine carbon is not desired. The preparation of an alkali metal-carbon powder mixture in order to purify the alkali metal halide is both cumbersome and counter-productive. Other disadvantages of the "991" teachings are the use of a static atmosphere of gaseous halogen and the potential for rehydrolysis during the sealing of the reaction ampule and removal of the gaseous halogen.

British Pat. No. 1,137,582, dated Dec. 1968, also teaches a method for producing and/or refining of Alkali Metal Halides. It, too, involves multiple steps which result in the rehydrolysis of the product. In this patent, a halogen source is entrained in a carrier gas. Entrainment leads to a deposit of carbon in the final product, thereby reducing the purity level to an undesirable point. Following the treatment of the metal halide at an elevated temperature, 582 teaches the removal of the entrained halogen source and subsequent sealing of the reaction ampule. Applicants disregard these teachings because they considered them to produce undesirable results. When glass containing absorbed moisture is reheated to its melting point, as needed to seal the glass ampule (Page 2, lines 93–98 of 582), the absorbed moisture will be released and cause rehydrolysis of the purified materials in the absence of a continuous stream of gas acting as a "moisture getter."

While each of the above cited prior art references deal in some manner with purification processes for metal halides, they do not yield materials as acceptable for use in laser technologies. Impurity levels below that detectable by conventional analysis techniques show up as major problems when the materials are subject to high power laser applications. As stated before, unmeasurable OH⁻ present in alkali metal halides absorbs laser energies and renders these materials less efficient. Applicants have found a way to eliminate these impurities and overcome the disadvantages of the prior art processes.

BRIEF DESCRIPTION OF THE INVENTION

We have now discovered that when alkali metal halides in the molten form are scrubbed with gaseous nascent halogen, preferably halogen corresponding to the halide anion, it will remove trace impurities of both anions and cations. The purified material may then be used to form single crystals from which laser windows may be produced.

DETAILED DESCRIPTION OF THE INVENTION

The interaction of cation and anion impurities and vacancies of crystal latices combine to form complexes which interfere with the use of such crystals when used to form laser windows. The problem is particularly acute when the windows are used with high energy laser such as 10.6$\mu$. As an illustration, bivalent cation impurities such as $Ca^{+2}$ or $Mg^{+2}$ stabilize the hydroxide ion, OH⁻, in potassium chloride and sodium chloride crystals. This coupling of impurities limits the effectiveness of topochemical exchange as a means for removing low level OH⁻. Reciprocally, the effectiveness of zone refining to remove low level cation impurities is limited by the hydroxyl content. In contrast, treatment of the materials in accordance with this invention, in which the molten salt is exposed to a reactive scrubbing atmosphere, provides a distinct advantage by simultaneously purifying the material with respect to both cation and anion impurities.

Under an atmosphere containing nascent gaseous halogen, distribution between the melt and the vapor phases of the molecular form of the impurity results from its reaction with the active component of the vapor phase. We used a continuous gas stream which prevents the melt-vapor distribution from attaining a steady-state relation. The gas stream sweeps away the molecular impurities which deposit downstream in the colder portion of the apparatus or separate chamber.

The nascent gaseous halogen may be obtained through the dissociation of carbon tetrachloride, chloroform, phosgene, carbon tetrabromide or bromoform into the respective atomic species.

Alkali metal halides such as KCl, NaCl, NaBr and KBr may be purified by this process via the proper selection of a halogen source species containing the identical halide.

The halogen source species is maintained throughout the purification process and during the cool down phase of the process following purification.

In one form of our invention, we have used a conventional zone refining apparatus, employing an approximately 2-inch ID quartz tube, held nearly horizontal, which enclosed an 18-inch long × 2-inch diameter vitreouscarbon boat. The molten zone was approximately 2 inches wide and was moved at the rate of 5 in./hr. Three unidirectional passes were made. Helium was the carrier gas used for $CCl_4$ vapor. A starch-KI solution was used to detect $Cl_2$ in the exit gas, an indication that atomic chlorine is being generated by the dissociation of $CCl_4$.

In another form of our invention, the container holding the molten material and the heating unit around the refining apparatus were maintained in a steady position with relation to each other. The reactive atmosphere however was continuously passed from one end of the chamber over the molten material and exited at the other end of the chamber. Utilizing molten potassium chloride having magnesium ion levels of 0.0050%, lead ion levels of 0.22%, iron ion levels of 0.023%, and nickel ion levels of 0.032% exposure of this melt to carbon tetrachloride vapors at 800°C for 5 hours reduced the magnesium content to 0.0016%, the lead content to 0.039%, the iron content to 0.0010%, and the nickel content to 0.02%.

It is essential that the apparatus employed in this invention not be a source of contamination. This can be assured by exposing the apparatus and particularly the container for the molten alkali halide to gaseous nascent halogen for 10 hours.

Salts which have been purified by the process of this invention and allowed to cool to the solid state may be grown into single crystals by conventional processes. Laser windows are cut from the crystal and finished by conventional polishing methods.

We claim:

1. A method for the purification of alkali metal chlorides and bromides containing trace cationic and anionic impurities comprising the steps of exposing the reaction apparatus to a nascent sweep halogen gas for 10 hours to remove contaminants, forming a moving molten zone in said alkali metal halide placed in said apparatus while scrubbing said metal halide with a continuous stream of a gaseous nascent halogen corresponding to the halide of the alkali metal being scrubbed for 5 hours and allowing said halide to cool under a continuous stream of gaseous nascent halogen, thereby obtaining said alkali metal halides having a purity useful in laser technologies.

2. A method of claim 1 wherein said halide is chloride and said gaseous nascent halogen is obtained from carbon tetrachloride, chloroform or phosgene.

3. A method of claim 1 wherein said halide is bromide and said gaseous nascent halogen is obtained from carbon tetrabromide or bromoform.

4. A method of claim 2 wherein said alkali halide is NaCl or KCl.

5. A method of claim 3 wherein said alkali halide is NaBr or KBr.

* * * * *

UNITED STATES PATENT OFFICE
CERTIFICATE OF CORRECTION

PATENT NO. : 3,969,491
DATED : July 13, 1976
INVENTOR(S) : Ricardo C. Pastor & Arthur J. Timper It is certified that error appears in the above-identified patent and that said Letters Patent are hereby corrected as shown below:

Column 1, line 36, "sigle" should read --single--.
Column 2, line 17, "fur-" should read --Fur--.
Column 2, line 52, "582" should read --"582"--.
Column 2, line 59, "582" should read --"582"--.
Column 3, line 5, "piror" should read --prior--.

Signed and Sealed this

Twenty-fourth Day of May 1977

[SEAL]

Attest:

RUTH C. MASON
Attesting Officer

C. MARSHALL DANN
Commissioner of Patents and Trademarks